United States Patent [19]

Mio

[11] Patent Number: 5,680,122

[45] Date of Patent: Oct. 21, 1997

[54] PLATOON RUNNING CONTROL SYSTEM

[75] Inventor: Masahiro Mio, Susono, Japan

[73] Assignee: Toyota Jidosha Kabushiki Kaisha, Toyota, Japan

[21] Appl. No.: 694,382

[22] Filed: Aug. 8, 1996

[30] Foreign Application Priority Data

Sep. 11, 1995 [JP] Japan .................. 7-232890

[51] Int. Cl.$^6$ .................. G08G 1/00; G08G 1/096
[52] U.S. Cl. .................. 340/932; 340/904; 340/902; 340/436; 180/167
[58] Field of Search .................. 340/932, 904, 340/903, 902, 901, 436; 180/267, 167

[56] References Cited

U.S. PATENT DOCUMENTS

| 4,621,705 | 11/1986 | Etoh ............................. | 340/904 |
|-----------|---------|-----|---------|
| 4,706,086 | 11/1987 | Panizza ......................... | 340/902 |
| 4,934,477 | 6/1990  | Dai .............................. | 340/436 |
| 5,091,726 | 2/1992  | Shyu ............................. | 340/904 |
| 5,249,027 | 9/1993  | Mathur et al. ................... | 356/1   |
| 5,289,183 | 2/1994  | Hassett et al. .................. | 340/905 |
| 5,295,551 | 3/1994  | Sukonick ........................ | 180/167 |
| 5,331,561 | 7/1994  | Barrett et al. .................. | 364/447 |
| 5,369,591 | 11/1994 | Broxmeyer ....................... | 180/167 |
| 5,416,711 | 5/1995  | Gran et al. ..................... | 364/436 |
| 5,424,726 | 6/1995  | Beymer .......................... | 340/932 |

FOREIGN PATENT DOCUMENTS

| 62-53529  | 3/1987 | Japan . |
|-----------|--------|---------|
| 5-170008  | 7/1993 | Japan . |
| 6-262988  | 9/1994 | Japan . |

*Primary Examiner*—Jeffery Hofsass
*Assistant Examiner*—John Tweel, Jr.
*Attorney, Agent, or Firm*—Kenyon & Kenyon

[57] ABSTRACT

A platoon running control system which is able to recognize the position of a vehicle within a platoon and to appropriately respond to a change, for example, when another vehicle leaving the platoon. If the vehicle is not in a platoon running mode, a communication control ECU assigns an ID=1 to the vehicle, and a vehicle control ECU operates the vehicle in an auto-drive mode based on a signal such as from a magnetic sensor or a CCD camera. During platoon-running mode, a light receiver receives data including ID information from a preceding vehicle, and the controlled vehicle is assigned an ID according to a rule in which the ID of the vehicle=ID of the preceding vehicle+1. Then, the vehicle starts platoon running using data from the preceding vehicle. When the system received information that the preceding vehicle will leave the platoon, platoon-leaving data is transmitted to the vehicle, which then transmits such data to the following vehicle. The vehicle changes its ID to 1 when it does not receive any more data from the preceding vehicle. In a case where its ID has been changed to 1 from 3 or greater, the vehicle accelerates so as to re-form the platoon.

7 Claims, 4 Drawing Sheets

PLATOON RUNNING CONTROL SYSTEM

BACKGROUND OF THE INVENTION

1. Field of the Invention

This invention relates to a platoon running control system, and more particularly to a system for controlling a vehicle running in a platoon while recognizing its position within the platoon.

2. Description of the Prior Art

When vehicles travel on an expressway, it is occasionally desirable for a vehicle to follow a preceding vehicle in view of reducing the driving operation, and therefore a plurality of vehicles may sometimes run in a platoon (The running state in which a plurality of vehicles run in a platoon is hereinafter called "platoon running"). It has been proposed to actively utilize such platoon running in auto-driving of vehicles.

For example, Japanese Patent Laid-Open No. Hei 5-170008 discloses a system, installed on a vehicle, which receives control operation data, running state data, vehicle specifications, and so on from a preceding vehicle and calculates a control amount for the vehicle based on the received data and the vehicle running condition, so that the vehicle will follow the preceding vehicle. This system enables the vehicle to predict its running condition before the actual control result of the preceding vehicle is obtained. Thus, the vehicle can smoothly follow the preceding vehicle without an extensive control delay.

However, the foregoing prior art is prone to the following problem. Assume that three or more vehicles run in a platoon and that a second vehicle simply follows a first vehicle on the basis of data from the first vehicle, and a third vehicle follows the second vehicle on the basis of data from the second vehicle, and so on. In this situation, it may be difficult to appropriately control a vehicle if, for example, a vehicle running immediately in front of the vehicle leaves the platoon. For example, if the first vehicle leaves the platoon, the second vehicle has to function as a leading vehicle and must shift its operation from a follower mode to an auto-driving mode. On the other hand, if the second vehicle leaves the platoon, the third vehicle may continue running in the follower mode because the first vehicle now serves as a leading vehicle. Thus, if it is possible to appropriately change vehicle running mode based on the position of the vehicle within a platoon, a more flexible and adaptable control operation can be realized. However, such a feature has not been considered in the prior art.

SUMMARY OF THE INVENTION

The present invention is intended to overcome the foregoing problem of the prior art, and provides a platoon running control system which recognizes a position of a vehicle within a platoon and appropriately controls the vehicle according to its position, even when there is a change in the platoon.

In order to accomplish the foregoing object of the invention, there is provided a platoon running control system, installed on a vehicle, comprising: a receiving portion for receiving data transmitted from a preceding vehicle; a transmitting portion for transmitting data to a following vehicle; an identification code setting portion for assigning to the vehicle an identification code indicative of a leading vehicle if the receiving portion has not received data, and an identification code obtained by converting the identification code of the preceding vehicle contained in the received data according to a predetermined rule if the receiving portion has received the data; and a control portion for controlling running of the vehicle based on the identification code assigned to the vehicle by the identification code setting portion. The identification code indicates the position of this controlled vehicle within the platoon, and is used to appropriately control the vehicle depending on its position within the platoon.

Although the identification code indicative of the leading vehicle may be set to any number, 1 is particularly preferable. The predetermined rule may be optimally set as follows:

ID of the vehicle=ID of the preceding vehicle+1

Such a rule is preferable because this makes the ID of the leading vehicle 1, the ID of the second vehicle in the platoon 2, the ID of the third 3, etc. As such, the identification codes can indicate respective positions of vehicles within the platoon.

When the ID of the vehicle is not the ID indicative of the leading vehicle, the control section controls the running operation of the vehicle based on the running data from the preceding vehicle, so that platoon running can be reliably operated. In this case, the vehicle control does not necessarily depend only on the data from the preceding vehicle. For example, it is possible to use additional data, such as on-road data detected by a sensor installed on the vehicle.

On the other hand, when the ID of the vehicle is the ID indicative of the leading vehicle, it in effect means that the vehicle is running as a head of the platoon. However, the vehicle may be assigned the ID indicative of the leading vehicle, in cases where the vehicle was the third vehicle in the platoon and the second vehicle has left the platoon. This is because, in this situation, the vehicle cannot receive data from the preceding vehicle. Therefore, even if the vehicle has the ID indicative of the leading vehicle, the vehicle may be controlled so that it accelerates and catches up with (moves close to) a currently preceding vehicle, when the previous ID of the vehicle indicates that it was the third vehicle.

Further, if the vehicle wishes to leave the platoon, it transmits such information to the following vehicle, which then receives the information. This process ensures a reliable control operation. Specifically, if the vehicle receives platoon-leaving information from the vehicle ahead, the vehicle recognizes that it will soon be unable to receive data from the preceding vehicle and then changes its ID to an ID indicative of the leading vehicle. The determination as to whether or not the preceding vehicle was the leading vehicle can be made based on the previous ID of the vehicle. For example, if the previous ID of the vehicle indicates that it was the third running vehicle of the platoon, the preceding vehicle which has left the platoon was not the leading vehicle. In this case, the vehicle still has another preceding vehicle, and operates an acceleration control to catch up with the preceding vehicle.

BRIEF DESCRIPTION OF THE DRAWINGS

The present invention will become more apparent from the following detailed description of a presently preferred embodiment when taken in conjunction with the accompanying drawings.

DESCRIPTION OF THE A PREFERRED EMBODIMENT

Figure 1:
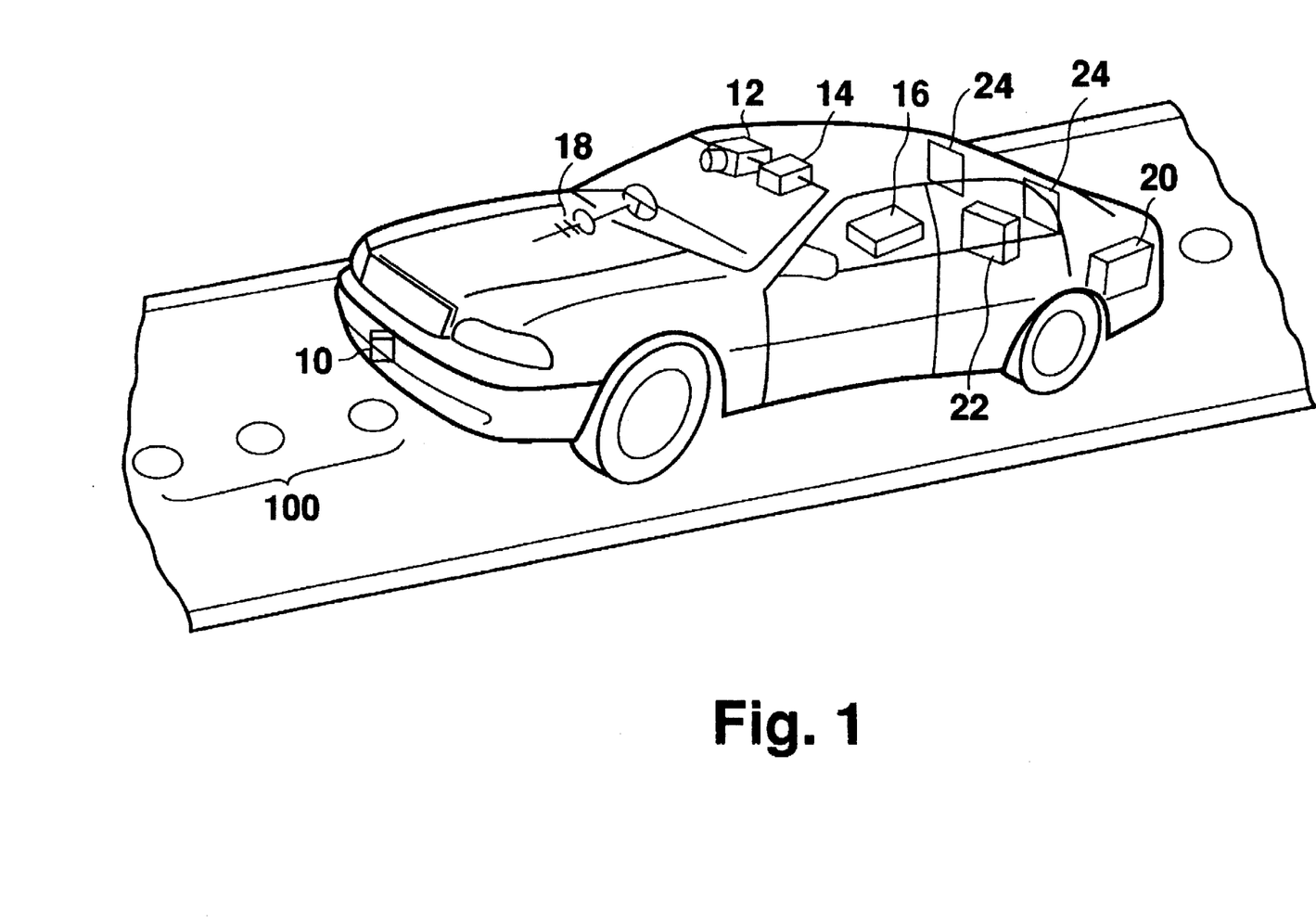
FIG. 1 is a schematic view showing the configuration of a platoon running control system according to the present invention.
Figure 2:
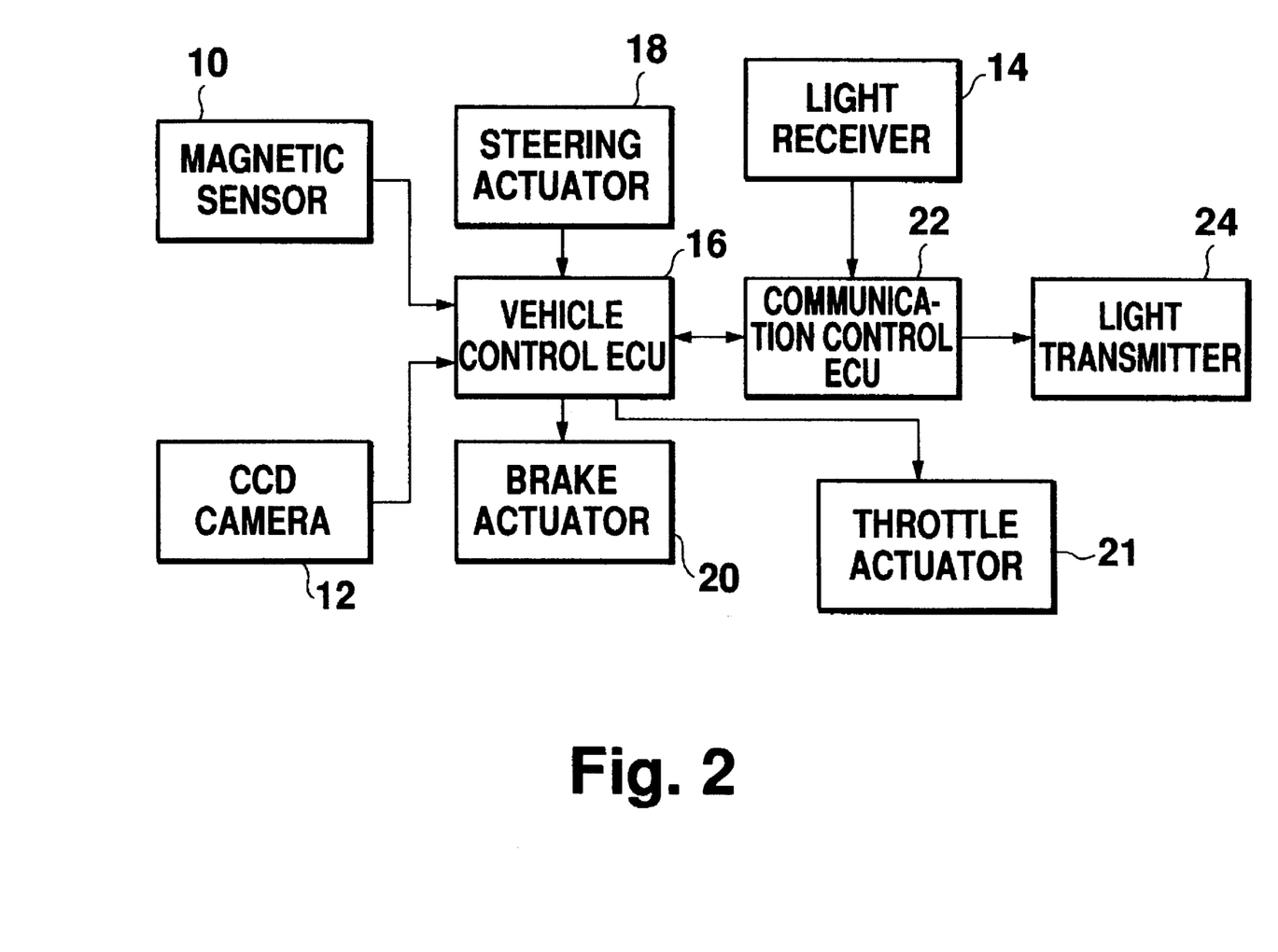
FIG. 2 is a block diagram showing the configuration of the platoon running control system shown in FIG. 1.

Referring to FIG. 1, a vehicle to which the present invention is applied includes, at its front end, a magnetic sensor 10 for detecting magnetism generated from magnetic markers 100 placed on a road surface. The magnetic intensity detected by the magnetic sensor 10 is used to determine the position of the vehicle on the road, that is, a lateral displacement of the vehicle from the center of the road. The vehicle also includes at its inner upper portion a CCD camera 12 for photographing a scene in front of the vehicle, such as a preceding vehicle or the like. The captured image is then processed and used for controlling the vehicle when it follows a preceding vehicle or when it runs by auto-driving operation. A light receiver 14 is disposed adjacent to the CCD camera 12 and receives light (optical) data transmitted from the preceding vehicle. Data reception/transmission is not limited to light. Infrared rays, ultrasonic waves, millimeter waves and microwaves are also preferable as a desired data transmission means. A detection signal from the magnetic sensor 10 and an image signal from the CCD camera 12 are supplied to a vehicle control ECU located at the center of the vehicle. The vehicle control ECU 16 is composed of a microcomputer, and controls the operation of the vehicle according to an identification code (ID), which will be described later. Specifically, the vehicle control ECU 16 activates a steering actuator 18 based on the detection signal supplied from the magnetic sensor 10 or activates the steering actuator 18, a brake actuator 20, or a throttle actuator 21 based on the running data of the preceding vehicle received by the light receiver 14. The data received by the light receiver 14 is supplied to a communication control ECU 22. Further, a light transmitter 24 is provided at the rear portion of the vehicle so as to transmit data to a following vehicle. The communication control ECU 22 controls the data to be transmitted from the light transmitter 24 and the timing of such data transmission. The communication control ECU 22, which is also composed of a microcomputer, transmits and receives data to and from the vehicle control ECU 16. The communication control ECU 22 also processes identification codes on the basis of the data concerning the preceding vehicle transmitted from the light receiver 14, as will be described later. Specifically, the communication control ECU 22 assigns an identification code ID to the vehicle while transmitting the identification code ID and platoon-leaving information to the following vehicle.

In this embodiment, a communication system at the time of platoon running is preferably a narrow band communication system in which information from the preceding vehicle is transmitted only to the controlled vehicle. The communication may be limited to only one direction, that is, from the preceding vehicle to the vehicle following it. The information to be transmitted includes an identification code ID of the vehicle, a speed of the vehicle, an acceleration and deceleration, a steering angle, a brake actuation/release signal, and a special notice to the following vehicle. The ID is useful when each vehicle in the platoon recognizes its position therein. The vehicle speed, acceleration/deceleration, steering angle and so on are effective in controlling running of the following vehicle in the platoon. The special notice is effective in informing the following vehicle that the controlled vehicle is about to leave the platoon, or that it is about to merge in the platoon.

The platoon running of this embodiment is carried out using the foregoing system configuration. The basic algorithm of this platoon running is as follows:

(1) All the vehicles in auto-drive operation are supposed to participate in the platoon running when predetermined conditions are met.

(2) In the first place, all the vehicles in the auto-driving have an identification code ID=1 indicating that each vehicle is a leading vehicle, and transmit the ID backward.

(3) When a vehicle receives data from a preceding vehicle, the vehicle changes its ID according to the following rule:

ID of the vehicle=ID of the preceding vehicle+1.

Further, a message indicating such an ID change is provided as a special notice.

For example, when the controlled vehicle is in auto-driving and moves within a predetermined distance from the preceding vehicle, the preceding vehicle transmits data ID=1 to the controlled vehicle. Then, the ID of the vehicle is changed to ID=2. The communication control ECU 22 of the vehicle transmits the data ID=2 to the following vehicle. The vehicle control ECU 16 of the following vehicle changes its ID to ID=3. In this way, each vehicle in the platoon is provided with each ID indicative of its position within the platoon.

Figure 3:
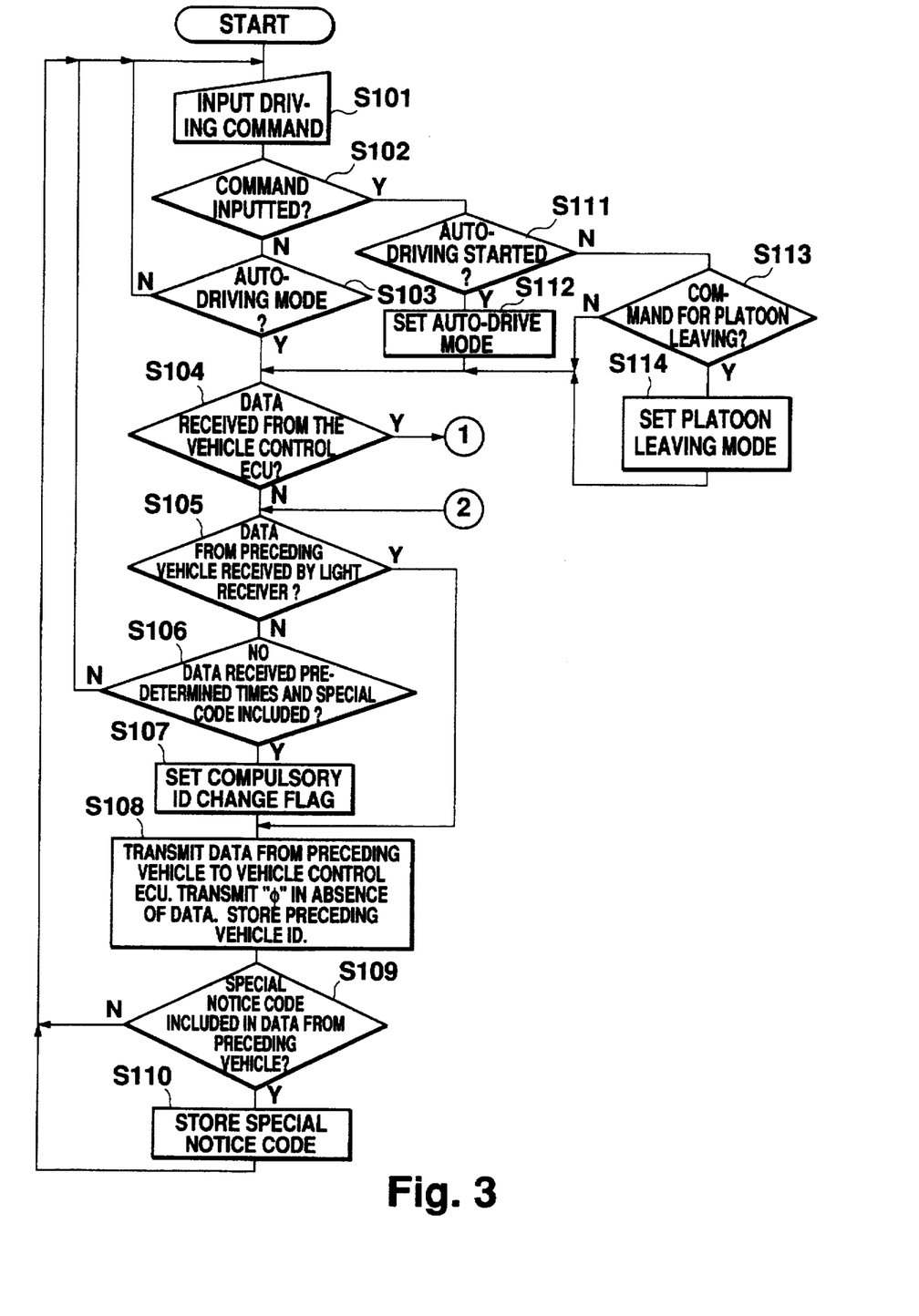
FIG. 3 is a flowchart showing operations of a vehicle control ECU and a communication control ECU.
Figure 4:
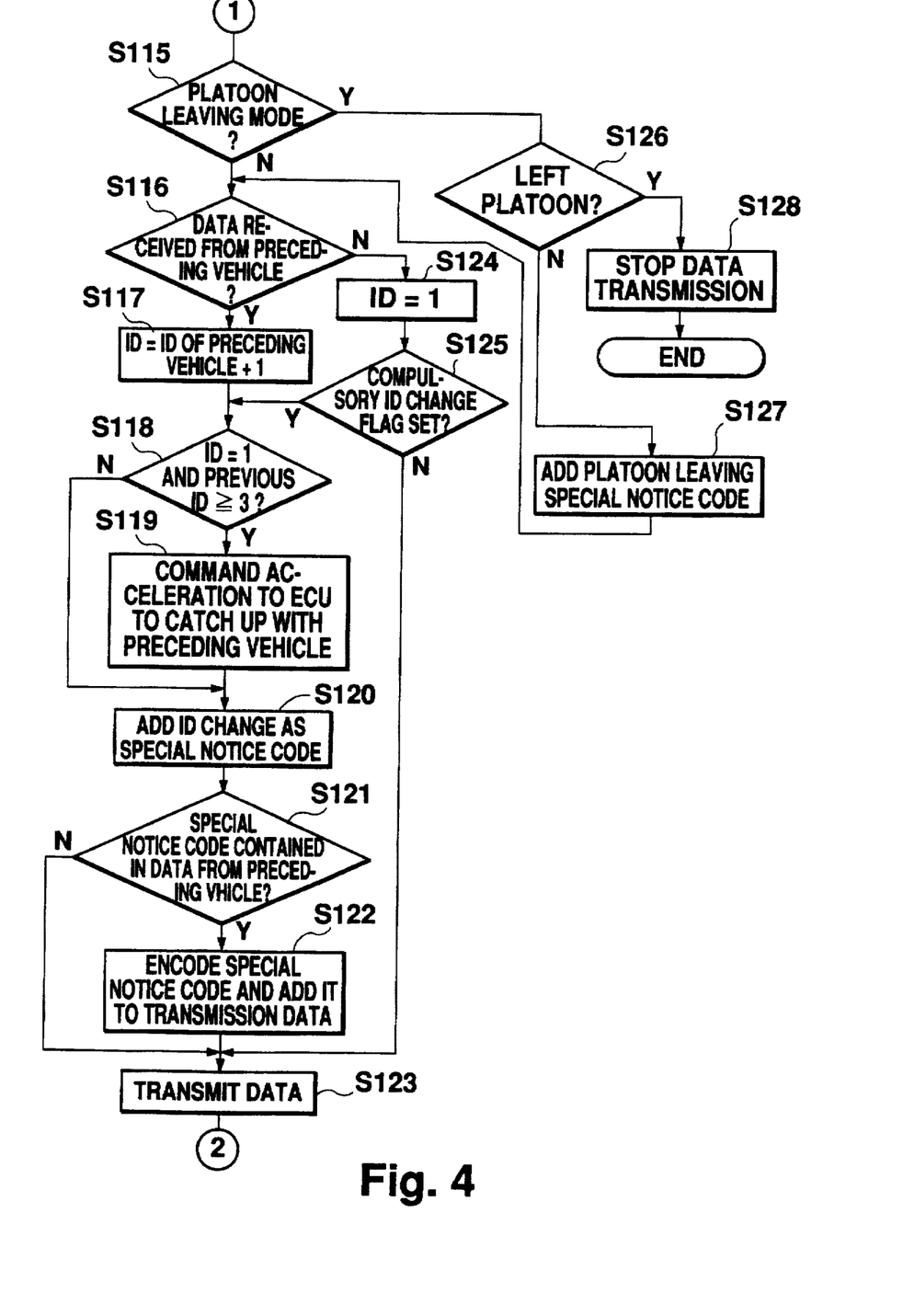
FIG. 4 is a continuation of the flowchart shown in FIG. 3.

Referring to the flowcharts of FIGS. 3 and 4, the operation sequences of the vehicle control ECU 16 and the communication control ECU 22 will be described in detail.

First, when an operator inputs a certain operation command, the vehicle control ECU 16 determines whether or not the input command is related to starting auto-drive operation (steps S101, S102, S111). If it is the auto-drive operation start command, the vehicle control ECU 16 sets an auto-drive mode (step S112). In the auto-drive mode, as described above, the magnetic sensor 10 detects the magnetic markers 100 and calculates the lateral displacement of the vehicle. The steering actuator 18, the brake actuator 20, and the throttle actuator 21 are controlled so as to regulate vehicle speed. Alternatively, white lines defining a lane where the vehicle runs may be detected from the picture captured by the CCD camera 12 in order to control the steering angle of the vehicle along the white lines.

After the auto-drive mode is set, it is determined whether or not the communication control ECU 22 has received data from the vehicle control ECU 16 (step S104). If the communication control ECU 22 has received such data, it is then determined whether or not the vehicle is set to a platoon-leaving mode (step S115). (In order to leave the platoon, the driver sets the platoon-leaving mode. Then, the vehicle control ECU 16 shifts the vehicle operation mode to the platoon-leaving mode; this mode will be described in more detail later.) If the vehicle is not set to platoon-leaving mode, but remains in auto-drive mode, the communication control ECU 22 determines whether or not data has been received from the preceding vehicle (step S116). The data from the preceding vehicle is first received by the light receiver 14 and then transmitted to the communication control ECU 22. The absence of data from the preceding vehicle represents that the controlled vehicle is running alone or is a leading vehicle. In this state, the ID=1 indicative of a leading vehicle is assigned to the vehicle (step S124). It is further determined whether or not a compulsory ID change flag has been set (step S125). The compulsory ID change flag is set when the preceding vehicle informs it will leave the platoon; this will be described in detail later.

On the other hand, if data from the preceding vehicle has been received in step S116, this means that the vehicle follows the preceding vehicle. Then, the vehicle receives a new ID, i.e. ID of the preceding vehicle+1 (step S117).

It is then determined, at step S118, whether or not the present ID=1 and the previous ID≧3. For example, if the vehicle was a second vehicle within the platoon and the preceding vehicle left the platoon, the ID of the vehicle is changed from ID=2 to ID=1 at step S124, and the previous ID is determined to be less than 3. On the other hand, if the vehicle was a third vehicle within the platoon and the preceding vehicle left the platoon, the ID of the vehicle is changed from ID=3 to ID=1 at step S124, and the previous ID is recognized as being 3 or greater. When the previous ID of the vehicle is recognized as being 3 or more, that is, if the vehicle was in the third or succeeding position within the platoon and the preceding vehicle left the platoon, this means that the vehicle has now at least one preceding vehicle. In this case, an acceleration command is supplied to the vehicle control ECU 15, which then controls the vehicle to catch up with the preceding vehicle (step S119). On the contrary, if the previous ID is less than 3, the vehicle is now a leading vehicle, so that the foregoing control operation will not be performed.

The ID of the vehicle increases when the vehicle participates in the platoon and now follows the preceding vehicle. On the contrary, the ID of the vehicle decreases when the preceding vehicle has left the platoon. In either case, the following vehicle may be affected, i.e., the ID of the following vehicle will soon be changed. Therefore, in order to inform the following vehicle of this, the communication control ECU 22 adds a special notice including an ID change message and so on to transmission data (step S120). Here, the special notice also includes platoon-leaving information of the controlled vehicle and of the preceding vehicle. It is further determined whether or not the data received from the preceding vehicle contain the special notice (step S121). If the data contain the special notice, the special notice is encoded and added to the vehicle's transmission data (step S122). Then, this special notice is transmitted to the following vehicle along with the vehicle running data, (step S123). In this way, when the controlled vehicle receives the platoon-leaving information from the preceding vehicle, the information is transmitted to the following vehicle. Therefore, not only the running data of the controlled vehicle but also information on the preceding vehicle are transmitted to the following vehicle. Thus, the following vehicle can recognize the platoon running state and smoothly continue platoon running.

As described, if the controlled vehicle is the leading vehicle, it is assigned ID=1. On the other hand, if the vehicle follows the preceding vehicle within the platoon, it is assigned an ID according to its position within the platoon. If the vehicle is assigned the ID and receives data from the preceding vehicle, the data is transmitted to the vehicle control ECU so as to continue platoon running (steps S104, S105, S108). Specifically, data from the preceding vehicle contains running data such as the vehicle speed, acceleration/deceleration, steering angle, and ID. The vehicle control ECU 16 calculates a control amount based on the running data and activates the steering actuator 18, the brake actuator 22, and so on. During platoon running, it is preferable to control vehicle-to-vehicle distance and vehicle speed using data from the magnetic sensor 10 and the CCD camera 12 as well as the data from the preceding vehicle. For example, it is preferable to set a ratio of the data from the preceding vehicle to the road data, including the data from the magnetic sensor, to 4:6.

If the data from the preceding vehicle includes one or more special notice, they are stored in a memory (step S109). When the vehicle transmits data to the following vehicle, the stored special notice is checked as described above (step S121), and then is transmitted to the following vehicle.

When the controlled vehicle, which has the ID, does not receive any data from a preceding vehicle, this is checked a predetermined number of times (for example, 5), and it is further determined whether or not the vehicle has received a special notice of platoon-leaving from the preceding vehicle (step S106). If such a special notice of platoon-leaving is stored in memory, it means that the vehicle cannot receive data because the preceding vehicle has left the platoon. Then, the compulsory ID change flag is set as a preparation for change of the vehicle's ID (step S107). As already described, when this flag is set, it is recognized that the ID of the vehicle has been changed to ID=1 because of the absence of a preceding vehicle (see step S125). Then, the control process advances to step S118. Specifically, if the vehicle was running in the third or succeeding position in the platoon before the preceding vehicle left the platoon, a command is provided to the vehicle control ECU 22 so as to accelerate the vehicle and continue platoon running. On the other hand, if the vehicle was second within the platoon, the vehicle is controlled to start auto-driving.

In addition to a case where the preceding vehicle leaves the platoon during platoon running, it is also conceivable that the controlled vehicle itself leaves the platoon. In this case, the driver of the vehicle inputs the platoon-leaving mode. Therefore, YES is determined at steps S102 and NO is determined at step S111 and the vehicle control ECU 16 changes operation mode to platoon-leaving mode (steps S113, S114). In this mode, the vehicle control ECU 16 drives the steering actuator 18 so that the vehicle will move to another lane. Before platoon-leaving is completed, the vehicle control ECU 16 adds a platoon-leaving code to the vehicle data as special notice, and transmits it to the following vehicle (steps S126, S127, S123). If platoon-leaving is completed, data transmission is terminated because there is no following vehicle (step S128). The completion of platoon-leaving may be determined, for example, based on whether or not the steering angle of the vehicle does not change by more than a predetermined amount. Further, in order to leave the platoon, the operator may manually operate the steering wheel, instead of automatic steering operation.

In the foregoing embodiment, the vehicle is provided with an ID=1 if it is the leading vehicle within the platoon. The vehicle is provided with an ID indicative of its position within the platoon if it follows a preceding vehicle. It is thus possible to definitely identify the position of the vehicle within the platoon. Therefore, if the preceding vehicle leaves the platoon, the vehicle can determine whether or not to resume platoon running based on the ID change in the vehicle itself. In this manner, the running of the vehicles can be appropriately controlled depending upon existing situations. Further, the following vehicles are notified if the preceding vehicle, or the controlled vehicle itself, leaves the platoon. Thus, the vehicles in the platoon can advantageously respond quickly and appropriately to a change of the platoon.

In this embodiment, if the data from the preceding vehicle contains platoon-leaving information, the controlled vehicle sets a compulsory ID change flag, and changes its ID to 1. Specifically, if the vehicle does not receive any more data from the preceding vehicle, or after the preceding vehicle has started to leave the platoon, the vehicle sets the compulsory flag. However, since the reception of platoon-leaving information from the preceding vehicle means that there will soon be no preceding vehicle, the vehicle may run at a fixed speed, or slightly decelerate and then run at the decelerated speed. Alternatively, it is also possible to sequentially shift from a platoon running control mode based on data from the preceding vehicle to the auto-driving mode. For example, in the platoon running mode, the ratio of the data from the preceding vehicle to the data from the magnetic sensor and so on is 4:6, as described above. However, when the vehicle receives platoon-leaving information, such a ratio may be changed to 2:8 so as to smoothly shift the operation mode to auto-driving.

The foregoing platoon-leaving operation is also applicable to a case where another vehicle merges into the platoon. The merged vehicle receives data from the preceding vehicle, and changes its ID from ID=1 to a new ID indicative of its position within the platoon after the merger according to the rule, ID=ID of the preceding vehicle+1. The merged vehicle then transmits the ID and also a special notice indicating its merger to the following vehicle. The following vehicle receives this special notice and transmits it to the next following vehicle, at the same time, adding 1 to its own ID. Alternatively, the light receiver 14 may receive information from a road beacon indicative of the presence of a merging vehicle and the vehicle control ECU 16 may be controlled to increase the distance between the vehicle and the preceding vehicle, so that the merging vehicle can join the platoon smoothly.

The platoon running control system of the invention enables each vehicle running within a platoon to recognize its position within the platoon, and can appropriately control the vehicle, even when there is a change in the platoon, according to the vehicle running states. It is thus possible to smoothly and rapidly re-form the platoon, even when a vehicle has left the platoon and the platoon becomes discontinuous.

While there have been described what is at present considered to be preferred embodiments of the invention, it will be understood that various modification may be made thereto, and it is intended that the appended claims cover all such modifications as fall within the true spirit and scope of the invention.

What is claimed is:

1. A running control system for controlling platoon-running installed on a vehicle, the system comprising:

(a) receiving means for receiving data which is transmitted from a preceding vehicle;

(b) transmitting means for transmitting data to a following vehicle;

(c) identification code setting means for assigning to the vehicle an identification code, wherein the identification code setting means either assigns a code indicating that the vehicle is a leading vehicle if the receiving means has not received any data from any preceding vehicle, or an identification code obtained by converting an identification code of a preceding vehicle contained in data received from the preceding vehicle according to a predetermined rule, if the receiving means has received data from the preceding vehicle; and (d) control means for controlling operation of the vehicle based on the identification code of the vehicle assigned by the identification code setting means, wherein the identification code indicates a position of the vehicle within a platoon.

2. The running control system according to claim 1, wherein the identification code indicative of the leading vehicle is 1, and the predetermined rule is expressed by the following expression:

$$\text{Identification code of the vehicle} = \text{Identification code of the preceding vehicle} + 1.$$

3. The running control system according to claim 1, wherein the control means controls the vehicle on the basis of the data from the preceding vehicle received by the receiving means, if the identification code of the vehicle is not the identification code indicative of the leading vehicle.

4. The running control system according to claim 1, wherein the control means controls the vehicle to accelerate and catch up with a currently preceding vehicle if a present identification code of the vehicle is indicative of a leading vehicle and a previous identification of the vehicle indicated that the vehicle was previously running in the third or later position within the platoon.

5. The running control system according to claim 1, further comprising:

(e) communication control means for superimposing platoon-leading information onto data to be transmitted to the following vehicle.

6. The running control system according to claim 1, wherein the identification code setting means also assigns to the vehicle the identification code indicative of the leading vehicle, if the receiving means has received platoon-leaving information from the preceding vehicle.

7. The running control system according to claim 1, wherein the control means determines whether or not a preceding vehicle which has left the platoon was the leading vehicle based on a previous identification code of the vehicle, and controls the vehicle to accelerate and catch up with a currently preceding vehicle if the vehicle which has left the platoon was not the leading vehicle.

* * * * *

UNITED STATES PATENT AND TRADEMARK OFFICE
CERTIFICATE OF CORRECTION

PATENT NO. : 5,680,122
DATED : October 21, 1997
INVENTOR(S) : Masahiro Mio

It is certified that error appears in the above-identified patent and that said Letters Patent is hereby corrected as shown below:

| Column | Line | |
|--------|------|---|
| Abs. | 4 | Change "leaving" to --leaves--. |
| Abs. | 8-9 | Change "platoon-running" to --platoon running--. |
| Abs. | 14 | Change "received" to --receives--. |
| 1 | 14 | Change "(The" to --(the--. |
| 3 | 4 | Delete "A". |
| 5 | 40 | Change "data," to --data--. |
| 6 | 31 | Change "steps" to --step--. |
| 7 | 41 | Change "modification" to --modifications--. |
| 7 | 46 | Change "platoon-running" to --platoon running--. |
| 8 | 38 | Change "platoon-leading" to --platoon-leaving--. |

Signed and Sealed this

Eighth Day of September, 1998

Attest:

BRUCE LEHMAN

*Attesting Officer*     Commissioner of Patents and Trademarks

REEXAMINATION CERTIFICATE (4032nd)

United States Patent [19]

[11] B1 5,680,122

Mio

[45] Certificate Issued Apr. 4, 2000

[54] PLATOON RUNNING CONTROL SYSTEM

[75] Inventor: Masahiro Mio, Susono, Japan

[73] Assignee: Toyota Jidosha Kabushiki Kaisha, Japan

Reexamination Request:
No. 90/005,162, Nov. 17, 1998

Reexamination Certificate for:
Patent No.: 5,680,122
Issued: Oct. 21, 1997
Appl. No.: 08/694,382
Filed: Aug. 8, 1996

Certificate of Correction issued Oct. 21, 1997.

[30] Foreign Application Priority Data

Sep. 11, 1995 [JP] Japan ................... 7-232890

[51] Int. Cl.$^7$ ............................................ G08G 1/00
[52] U.S. Cl. .................... 340/932; 340/904; 340/902; 340/436; 180/167
[58] Field of Search .................... 340/932, 904, 340/902, 436; 180/167

[56] References Cited

FOREIGN PATENT DOCUMENTS 0357963  4/1989  Germany .

*Primary Examiner*—Jeff Hofsass

[57] ABSTRACT

A platoon running control system which is able to recognize the position of a vehicle within a platoon and to appropriately respond to a change, for example, when another vehicle leaves the platoon. If the vehicle is not in a platoon running mode, a communication control ECU assigns an ID=1 to the vehicle, and a vehicle control ECU operates the vehicle in an auto-drive mode based on a signal such as from a magnetic sensor or a CCD camera. During platoon-running mode, a light receiver receives data including ID information from a preceding vehicle, and the controlled vehicle is assigned an ID according to a rule in which the ID of the vehicle=ID of the preceding vehicle+1. Then, the vehicle starts platoon running using data from the preceding vehicle. When the system receives information that the preceding vehicle will leave the platoon, platoon-leaving data is transmitted to the vehicle, which then transmits such data to the following vehicle. The vehicle changes its ID to 1 when it does not receive any more data from the preceding vehicle. In a case where its ID has been changed to 1 from 3 or greater, the vehicle accelerates so as to re-form the platoon.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2–7, dependent on an amended claim, are determined to be patentable.

1. A running control system for controlling platoon-running installed on a vehicle, the system comprising:
   (a) receiving means for receiving data which is transmitted from a preceding vehicle;
   (b) transmitting means for transmitting data to a following vehicle;
   (c) identification code setting means for assigning to the vehicle an identification code, wherein the identification code setting means either assigns a code indicating that the vehicle is a leading vehicle if the receiving means has not received any data from any preceding vehicle, or an identification code obtained by converting an identification code of a preceding vehicle contained in data received from the preceding vehicle according to a predetermined rule, if the receiving means has received data from the preceding vehicle; and
   (d) control means for controlling operation of the vehicle based on [the] *a change in the* identification code of the vehicle assigned by the identification code setting means,
   wherein the identification code indicates a position of the vehicle within a platoon.

\* \* \* \* \*